Nov. 18, 1930.  H. H. ENELL  1,781,751
IRRIGATING APPARATUS
Filed May 16, 1927

Inventor
Howard H. Enell
By Brockett & Hyde
Attorneys

Patented Nov. 18, 1930

1,781,751

UNITED STATES PATENT OFFICE

HOWARD H. ENELL, OF CLEVELAND HEIGHTS, OHIO

IRRIGATING APPARATUS

Application filed May 16, 1927. Serial No. 191,818.

This invention relates to irrigating apparatus and particularly to that type which is installed in lawns.

In use, these systems usually include a net work of piping sunk in the lawn with risers arranged at suitable points to supply sprinkler heads which are at grade and which produce overlapping sprays intended to water the entire area. In some instances these systems are installed in already existing lawns and in others they are placed in new work, so to speak, or in lawns which are just being built. In new lawns, or those newly built, the landscape architect, or other person in charge, roughly grades to stakes properly located. The finished grade is then made and the person in charge of the irrigation system must then find the risers and apply the proper connections for receiving the spray heads. This may require damage to the grading already done. In fact, it does in the usual installation result in such damage by reason of the fact that the system, including the net work of pipes and the spray heads, does not lend itself to an arrangement where the landscape architect or grader may grade to the risers of the apparatus.

The object of the present invention, therefore, is to provide an irrigating apparatus wherein the net work of supply pipes is provided with risers terminated substantially at grade whereby they may be used with or without the spray head as grading stakes, requiring, when the spray heads are applied, no further treatment and when the spray heads are not applied merely requiring removal of threaded plugs from the risers and the insertion of the spray heads which produce no material rise in the equipment at these points.

Invention also resides in a novel form of spray head arranged wherein the bulky part of the mechanism projects into the riser and its finishing upper part in a relatively flat plate arrangement which does not materially add to the height of the spray and interfere with the grade.

Further invention resides in the arrangement of spray-producing parts such that a revolving chamber is associated with a discharge orifice in a manner so that an ideal spray results. The spray in this case is not what might be termed a mechanical spray, but is one which results from the speed of rotation of the water entering the revolving chamber. A spray produced in this way is uniform throughout in the sense that the water is distributed evenly over the entire area covered by the spray. This results in a saving in water and an ideal application of the water to the lawn.

Further details of the invention may be brought out in the following description, drawings and claims.

Figure 1:
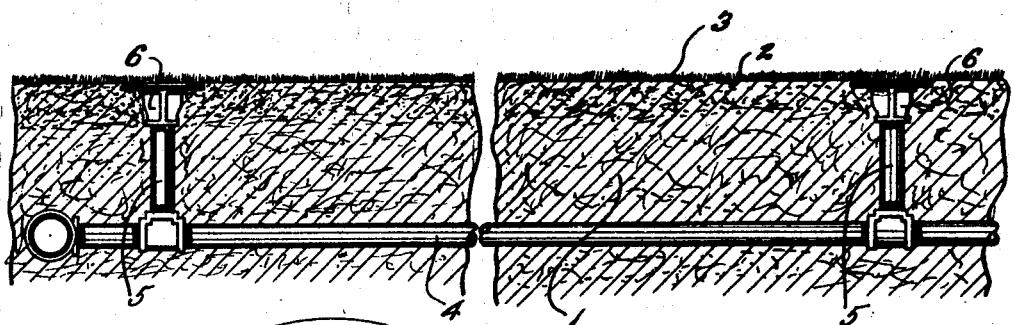
Figure 2:
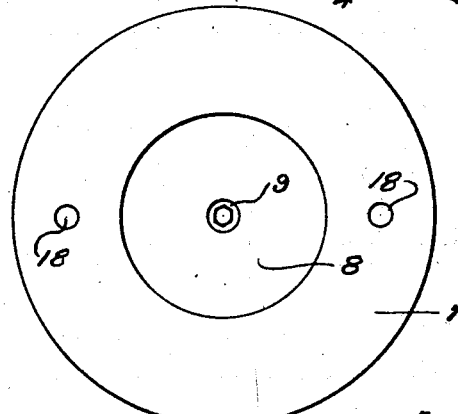
Figure 5:
Figure 3:
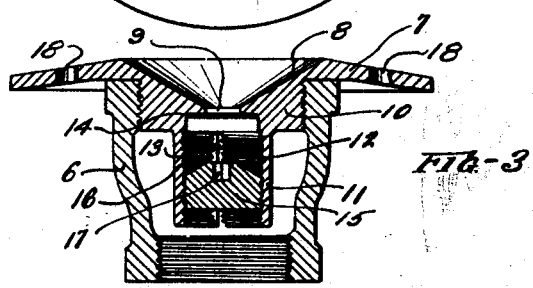
Figure 6:
Figure 4:
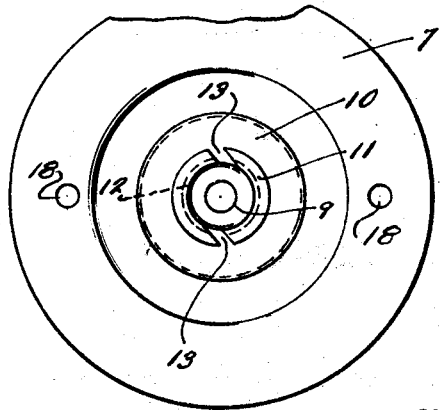

Referring to the drawings, Fig. 1 is a view showing a part of the installation as applied to a lawn; Fig. 2 is a top plan view of one of the sprinklers; Fig. 3 is a vertical section; Fig. 4 is a bottom plan view; Fig. 5 is a detailed view of the upper surface of the revolving chamber adjusting plug; and Fig. 6 is a side elevation of this plug shown in Fig. 5.

In the arrangement set forth in the drawings, the area to be equipped is indicated in Fig. 1, and comprises rough grading 1, finished grading 2 and grass or sod 3. Extending throughout the rough grading 1 are suitable supply pipes 4 provided at suitable distributed points with risers 5 provided at their upper ends with suitable couplings 6 capable of receiving the bodies of the spray heads to be described. All of these connections are standard in pipe and pipe fittings but the installation is made so that the upper end of each riser 5 and its coupling 6 is substantially at grade and may be plugged or provided with the spray head, as will appear, and may be used as grading stakes in the rough and finished grading of the lawn especially where a new lawn is being built. If the system is applied to an already installed one, the piping is arranged in trenches and the risers 5 and couplings are brought up substantially to the grade of the sod, and the earth and sod are returned.

The spray head utilized in this instance and forming a part of the invention in this case comprises a grade plate 7 shown round, and sloping generally toward the rim with a central conical depression 8 terminating at its apex in a spray orifice 9 of suitable diameter to produce the proper spray. The structure thus far described is provided with a threaded hub or shank 10 adapted to be screwed into a suitable coupling 6. Forming a part of this hub or shank 10 is a tubular extension or hollow body 11 threaded internally at 12 and provided with opposed tangential, vertically disposed slots 13, these slots being directed inward at a tangent in the direction of the threads 12 of the extension 11 so that the water passing in, and revolving in the extension as will appear, will be in the same direction as the threads. The slots 13 open out at the bottom of the extension 11 and terminate, above, at substantially the base of the shank 10. The opening in the tubular extension 11 extends up into the hub with a curved upper outer corner at 14, this opening being larger than the spray orifice 9, as shown. Engaging the thread 12 of the extension 11 is a revolving chamber adjusting plug 15 having an upwardly tapering top at 16 provided with a polygonal recess 17 adapted for the insertion of a suitably shaped wrench which may be projected through the spray orifice 9. By adjusting the position of the plug 15 in extension 11 the size of the revolving chamber produced above the plug and within the spray head, as thus far described, may be reduced and, at the same time, and by the same operation, the effective length of the openings of the slots 13 is reduced. By an adjustment of this plug the operator at once reduces the volume of water entering the revolving chamber and also reduces the size of the revolving chamber. In this way it has been found that the spray is uniform in its spraying characteristic, but may be reduced in size and area covered without sacrifice of efficiency. It has also been found that with a revolving chamber, supplied in this way with water from tangential slots, the speed of the revolving volume of water in the revolving chamber causes the water to pass up around the lip of the spray orifice 9 and to adjust itself in the conical recess 8 and project outward in a somewhat conical stream with uniform density whereby a uniform spray results.

The plate 7 may be provided with opposed openings 18 for the reception of a wrench for removal of the spray head. When the installation is made so that the risers come substantially to grade and the head is removable, it is possible, after installation, to replace a head without disturbing the lawn and without any grade difficulty.

Having described my invention, I claim:

1. A spray nozzle for lawn sprinkler systems, comprising a body portion threaded for connection to a piping system and provided with a cylindrical skirt member provided with tangentially disposed slots opening through its lower edge and extending longitudinally along the skirt, said skirt being internally threaded and enclosing an inner chamber, the body portion at the upper end of the skirt being provided with a cross wall having an outer conical depression flaring upwardly from a central through orifice smaller in diameter than said chamber and communicating therewith, and an imperforate plug threaded into the threads of said skirt and adapted for adjustment along the same in said chamber for more or less closing said slots therein.

2. A spray nozzle of the character set forth in claim 1, in which the tangential slots in the skirt member extend in the same direction as the upward spiral of the threads in said chamber, whereby the whirling effect upon the water produced by the slots is assisted by the upward travel of the water in the threads of said chamber.

In testimony whereof I hereby affix my signature.

HOWARD H. ENELL.